Jan. 1, 1957    G. HALVERSON    2,776,407
RECTIFIER TEST SYSTEM
Filed March 26, 1953

Inventor,
Gilbert Halverson,
By: Schneider & Dressler, Attys.

United States Patent Office 2,776,407
Patented Jan. 1, 1957

2,776,407
RECTIFIER TEST SYSTEM

Gilbert Halverson, Ingleside, Ill., assignor to Fansteel Metallurgical Corporation, a corporation of New York Application March 26, 1953, Serial No. 344,801

6 Claims. (Cl. 324—158)

This invention relates to a rectifier test system, and particularly to a system for showing the voltage and current conditions existing across a rectifier at any time under operating conditions. While the test system embodying the present invention may be used in connection with any asymmetrically conducting device, it is particularly suitable for use with rectifiers.

Rectifiers of the barrier layer type, such as for example selenium rectifiers or copper oxide rectifiers, have certain characteristics both in the forward and reverse directions which have a substantial bearing upon the utility and life of the rectifier cell. The characteristics of a cell under load conditions in an alternating current circuit may be substantially different from the characteristics of the same cell when subjected to a steady potential either in the conducting or reverse direction. Systems for showing the potential and current conditions across a rectifier under such steady state conditions have been known and while providing valuable data do not tell the entire story.

It is also known to have a system wherein the voltage or current characteristic of a rectifier in either one or the other direction may be observed under normal operating conditions. However, such systems do not show simultaneously the voltage and current characteristics in both the forward and reverse direction of potential.

The system embodying the present invention makes it possible to provide a visual characteristic curve of current against voltage of a rectifier cell or other asymmetrically conducting device while said cell is in operation under load. Such a system makes it possible to test quickly and decisively whether a selenium cell is satisfactory or not. Hitherto it has been the practice to age selenium cells and weed out the undesirable cells after the same have been under test for some time. A system embodying the present invention makes it possible to predict whether a cell has a useful life or is so defective as to render aging a waste of time.

In general, a system embodying the present invention impresses, upon a cathode ray tube, potentials corresponding to the potential across the rectifier under test and also across the rectifier load, the potentials for both parts of an alternating current cycle being successively impressed upon the cathode ray tube in a suitable manner so that traces for both the current conducting and current blocking parts of a cycle may be observed. For a more complete understanding of the invention, reference will now be made to the drawing wherein an exemplary embodiment of a system embodying the invention is shown, it being understood that variations of and departures from the specific system disclosed may be made without departing from the scope of the invention except as defined by the appended claims.

Referring therefore to the drawing.

Figure 1:
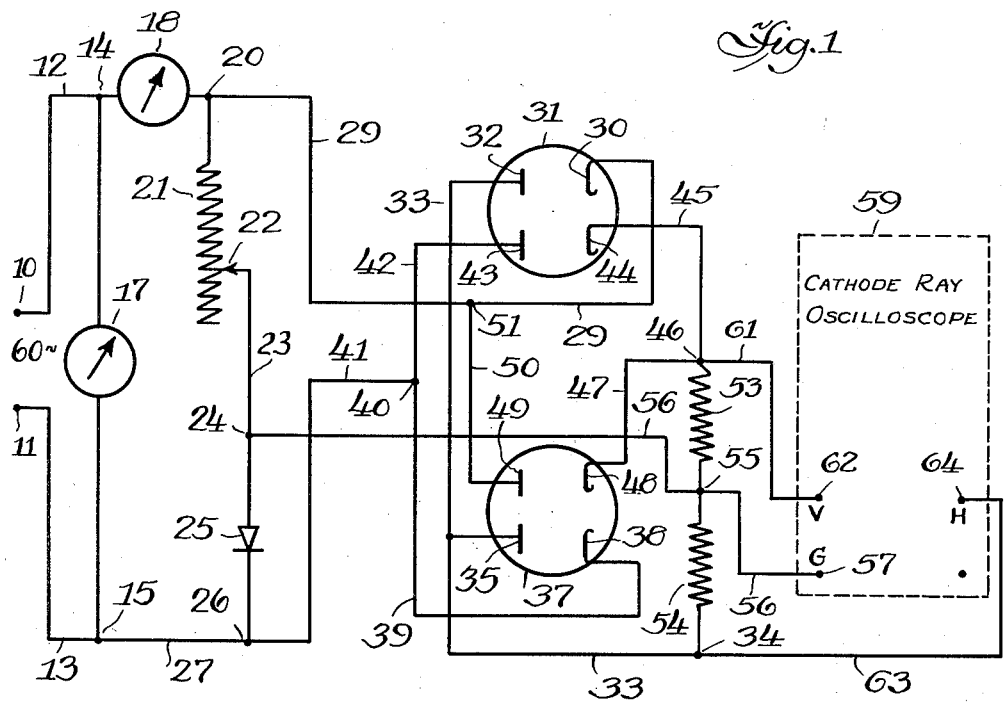
Figure 1 shows a circuit diagram of a system embodying the present invention.

Referring first to Figure 1, reference numerals 10 and 11 are alternating current supply terminals for energizing the rectifier under test. These supply terminals may be connected to any suitable source of alternating current having any desired wave shape and having any desired frequency. Terminals 10 and 11 are respectively connected by wires 12 and 13 to junction points 14 and 15. Across junction points 14 and 15 is connected alternating current meter 17 to indicate potential. The meter may be any one of a number of different types of voltmeters and may register peak potential or R. M. S. potential, as desired. Junction 14 is connected to one terminal of meter 18 for measuring current, the current to the meter being pulsating, as will be more fully apparent later.

Meter 18 has its other terminal connected to junction 20. Connected to junction 20 is resistor element 21 having wiper 22 cooperating therewith to provide a variable resistance. Wiper 22 is connected by wire 23 to junction point 24. Junction 24 is connected to one terminal of rectifier 25 to be tested, the other terminal of rectifier 25 being connected to junction 26 which is connected by wire 27 back to junction 15.

Rectifier 25 is a half-wave rectifier and may consist of one or a number of cells in series. The polarity of a rectifier in the system is unimportant. While a dry type rectifier is illustrated, the invention is equally applicable to electron discharge type of rectifiers or to devices having asymmetrically conducting properties.

Referring back to junction 20, wire 29 connects this junction to cathode 30 of a high vacuum electron discharge hot cathode type of rectifier generally indicated by numeral 31. Rectifier 31 is here shown as being of the double diode type and is preferably provided with an indirectly heated cathode having the customary heater for energizing the cathode. In practice, the double diode rectifier may be a 6H6 tube. Cathode 30 cooperates with anode 32 of the rectifier, this anode being connected by wire 33 to junction 34. Wire 33 is also connected to anode 35 of a double diode recifier 37, this double diode rectifier being generally similar to rectifier 31. It is understood that each or both of the double diode rectifiers may be separated into individual diodes or tubes used as rectifiers. In certain instances where reverse potential is not excessive, hot cathode gas tube rectifiers may be used. The indirectly heated cathodes may be replaced by directly heated cathodes. In that case, the energizing circuits for the cathodes will have to be isolated. Also, if desired, other types of rectifiers, such as germanium rectifiers, may be used. These rectifiers should have a low capacitance in comparison to the rectifier under test.

Referring to rectifier 37, anode 35 cooperates with indirectly heated cathode 38, this cathode being connected by wire 39 to junction 40. Junction 40 is connected by wire 41 back to junction 26.

Junction 40 is also connected by wire 42 to anode 43, this cooperating with cathode 44 of the companion rectifier in double diode 31. Cathode 44 is connected by wire 45 to junction 46. Junction 46 is connected by wire 47 to cathode 48 of rectifier 37. Cathode 48 cooperates with anode 49, this anode being connected by wire 50 to junction 51 on wire 29.

Between junctions 46 and 34 resistors 53 and 54 are connected in series, these resistors having a common junction 55 connected by wire 56 back to junction 24. It is preferred to have rectifiers 31 and 37 similar and resistors 53 and 54 substantially equal in value. Resistors 53 and 54 may be about a third of a megohm each and merely function as grid resistors across the input circuit to the amplifiers of a cathode ray oscilloscope. The input resistance of each oscilloscope amplifier must be of a substantially higher order than the resistance of resistor 21 and of the rectifier under test during blocking so as to have a negligible effect on the circuit under test. From junction 24, wire 56 goes to junction 55 and to ground or common terminal 57 of a cathode ray type of oscilloscope 59. Oscilloscope 59 is a conventional oscilloscope having horizontal and vertical amplifiers, and is provided with the usual sweep circuits for observing wave forms.

As used here, the horizontal and vertical deflecting systems are electrically independent of each other except that they both operate on a common electron beam.

From junction 46, wire 61 goes to terminal 62 for the vertical input to the oscilloscope, while wire 63 connects junction 34 to terminal 64 of the horizontal input for the oscilloscope.

It is assumed that the potential across junction 20 and 26 is low enough so that rectifier 25 may operate satisfactorily. Resistor 21 is also of a suitable load value to insure that the current flowing through the rectifier during the conducting part of a cycle will not damage the rectifier.

The operation of the system is as follows: First, let it be assumed that the positive half of an alternating current cycle is impressed upon the system. Junction 20 will be positive to junction 26, and let it be assumed that rectifier 25 conducts. It is clear that at any instant during this part of the cycle, the potential across rectifier 25 will be present at junctions 24 and 26. When junction 24 is positive, a circuit will be be established between anode 35 and cathode 38 of rectifier 37 to junction 26. This circuit is as follows—junction 24, wire 56, junction 55, resistor 54, junction 34, wire 33, anode 35, cathode 38, wire 39, junction 40, wire 41 to junction 26.

The value of resistor 54 is so great, compared to the resistance of the diode when conducting, that for all practical purposes, the potential across resistor 54 reflects the potential existing across rectifier 25. It is clear, therefore, that the potential curve during the conducting part of the cycle existing across resistor 54 will be applied to the oscilloscope through terminals 57 and 64 and show on the horizontal sweep.

At the same time, the potential at junction 20, with reference to junction 24, will be impressed upon the vertical input to the oscilloscope. The circuit for this may be traced as follows—junction 20, line wire 29, junction 51, wire 50, anode 49, cathode 48, wire 47 to junction 46, wire 61 to vertical input 62. Since junction 24 is connected to the common or ground terminal of the oscilloscope, the vertical input will show the potential between junction 20 and wiper 22. This potential will be a direct function of the current flowing through the rectifier 25.

It is assumed, of course, that the current through the rectifier 25 will be large in comparison to the current flowing through resistor 54. Hence, when the rectifier 25 is conducting, the horizontal input will show potential across the rectifier while the vertical input for the oscilloscope will show the current flowing through the rectifier 25.

Now, assume that the polarity of the cycle reverses so that junction 20 is negative to junction 26. Junction 26 will therefore be positive to junction 24. From junction 26, a circuit will be established as follows—junction 26, wire 41, junction 40, wire 42, electrodes 43 and 44 of the rectifier 31, wire 45, junction 46, wire 61 to vertical input terminal 62. Junction 24 is connected directly to the common input of the oscilloscope. Hence, on blocking, the vertical input to the oscilloscope will now show the potential across the rectifier.

A current-indicating circuit for the blocking part of the cycle is provided as follows—junction 24, wire 56, junction 55, resistor 54, junction 34, wire 33, electrodes 32 and 30 of the rectifier 31, wire 29 to junction 20. If any current flows through rectifier 25 in the reverse or blocking direction, the drop through the part of resistor 21 in circuit will be impressed upon the horizontal input of the oscilloscope. This, of course, is impressed from junction 34 of the circuit previously traced along wire 63 to terminal 64 of the horizontal input.

In the blocking direction, the potential across the rectifier under test is impressed on the vertical input of the oscilloscope while the current conditions are impressed upon the horizontal input of the oscilloscope.

This interchange of ordinates on the oscilloscope for the blocking and conducting parts of the cycle is advantageous. When rectifier 25 conducts, the potential across the rectifier is small while the current is comparatively large. This means, therefore, that considerable amplification might be necessary for showing the potential across the rectifier. Conversely, when the rectifier is blocking, the potential across the rectifier is large while the current should be small. In the system disclosed, therefore, the amplification for the vertical input of the oscilloscope may be adjusted to a satisfactory value, this being smaller than for the horizontal input in this instance. It is clear that the vertical deflecting system as a whole is therefore less sensitive than the horizontal deflecting system as a whole.

Figures 2, 3, 4:
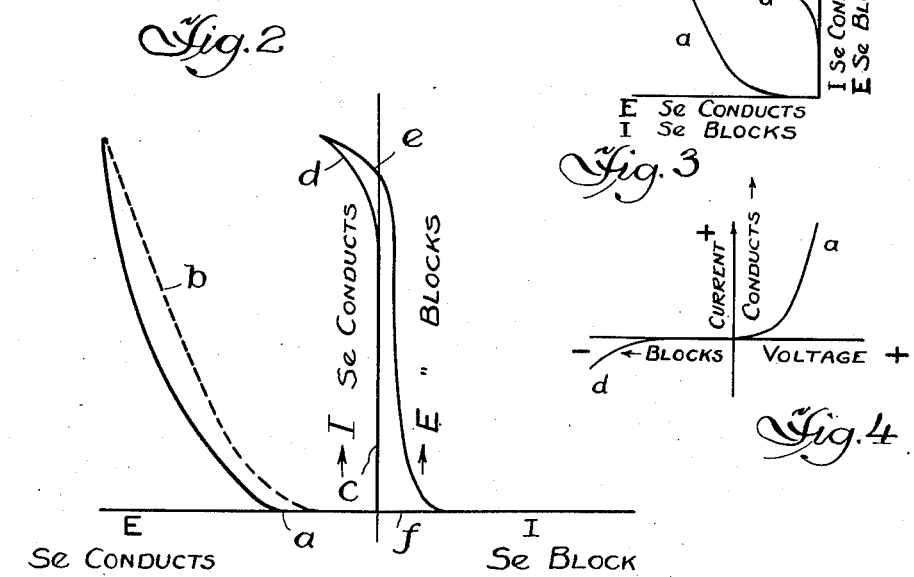
Figure 2 shows characteristic curves which may be obtained by the system shown in Figure 1, where the curves are affected by capacitance in the system.
Figure 3 shows characteristic curves which may be obtained by the system shown in Figure 1 where the curves are unaffected by capacitance.
Figure 4 shows the characteristic curves shown in Figure 3 where voltage and current parameters are shown on separate axes.

Referring now to Figure 2, some typical characteristic curves of an average selenium type rectifier which may appear on oscilloscope 59 are shown. The X axis represents the voltage or potential across the selenium rectifier when it is passing current in the conducting direction, and represents the leakage current through the selenium cell when the reverse voltage is applied.

Along the Y axis, only the positive part of the ordinate is used. The Y ordinate represents current or potential, depending upon the coordinate with which it is used. The polarity of the rectifier under test and the diode rectifiers may be changed. Also, the horizontal and vertical inputs may be changed.

Thus, referring to the curves, curve $a$ shows the characteristic during the conducting part of a cycle, with the potential across rectifier 25 first increasing, with the rectifier current being of negligible value, until conduction occurs. Then the current increases with potential. The sign of the potential on the axis must be disregarded, since the potential may either be positive or negative depending upon the type of rectifier used and the polarity of the oscilloscope. In any event, the full line of this curve shows that the current rises to a peak corresponding to the voltage peak. In some instances, the decrease in current with decrease in potential follows the same path as the current rise, while in other cases the decrease in current follows a different path, as shown for example, by the dotted line portion $b$ of the curve.

Upon blocking, curve $c$ shows the potential rising substantially straight without current flow. Some reverse current flows through the rectifier and is represented by the horizontal deflection of curve $d$. As the blocking potential begins to decrease in value from its peak, the curve in some cases does not coincide with the curve $d$ and may be indicated by curve $e$. This is caused by the capacitance of the rectifier under test. The horizontal distance between the curves $d$ and $e$ indicates the magnitude of this capacitance. It is obvious that the extensive electrode areas of a rectifier during blocking will result in the rectifier functioning as a condenser. The greater the frequency, the greater will be the current passed. At the bottom of the blocking potential, part $f$ of the curve shows the potential is zero and current drops to zero.

In Figure 3, the characteristics of a rectifier under test as seen on oscilloscope 59 is shown where the capacitance of the rectifier has a negligible effect on the curves. Curves $b$ and $e$ shown in Figure 2 are absent because the return traces coincide with curves $b$ and $e$.

In Figure 4, the curves shown in Figure 3 are duplicated where the voltage and current parameters are indicated on separate axes.

It is possible to reverse the polarities of the four diodes, the corresponding electrodes being connected as disclosed. Instead of a cathode ray oscilloscope, two separate indicating means having a common junction may be used. A single oscilloscope is clearly preferred, however, since it shows the instantaneous potentials and currents involved with respect to time, utilizing only a single instrument.

If two separate cathode ray tubes are used, then a common time parameter to connect the instantaneous indications is advisable. Thus, each tube may show along one axis time with reference to the alternating potential as a standard. One tube may show potential across the test rectifier against impressed alternating current potential on terminals 20 and 26. The other tube may show potential across the load resistor, which is a function of current through the test rectifier, against impressed alternating current potential on terminals 20 and 26. Such an arrangement is not preferred, however.

It is also possible to use a polar type of scan for the two cathode ray tubes.

It will be apparent that the oscilloscope as used here may be considered as consisting of two potential indicating means. One such means is the vertical deflecting part of the oscilloscope. The other means is the horizontal deflecting part. The two are connected in series with the common connection being ground, and have different response sensitivities. This common connection is directly connected to junction 24, which is the common connection between load 21 and rectifier 25 to be tested. In effect, that system of diodes constitutes a double-pole, double-throw reversing switch. This reversing switch connects the outer terminals of the two potential responsive means, the horizontal and vertical input terminals, to the outer terminals of the testing system, junctions 20 and 26, and reverses these connections with successive changes in polarity of the alternating potential impressed across terminals 20 and 26.

Other electronic switching means may be used instead of the system of diodes. However, the diode system is preferred because of its simplicity and the inherently fast valve action.

The apparatus of the present invention provides a quick and effective comparison test between a standard rectifier, known to be satisfactory, and a rectifier whose characteristics are unknown. The characteristic curve of the standard rectifier may be drawn on a transparent glass frame which is placed over the face of the cathode ray tube of oscilloscope 59. By comparing the shape of the characteristic curve of the rectifier under test with the standard curve, a quick check may be made of the quality of the test rectifier.

It should be noted that the preferred arrangement of the present invention provides a test of a rectifier under normal alternating current conditions wherein the current and voltage characteristics of the rectifier, in both directions of current conduction, may be simultaneously viewed on the face of a single cathode ray oscilloscope with equal facility.

I claim:

1. A system for testing an asymmetrically conducting device under operating conditions, said system comprising a pair of terminals for connection to a source of alternating current, a load connected between one system terminal and a common system terminal, said common system terminal and other system terminal being adapted to have the device under test connected thereto, a pair of potential responsive means connected in series, said responsive means having outer terminals and a common terminal, a direct connection between the two common terminals, and means including four half-wave rectifiers and connections between said rectifiers for connecting the outer terminals of the potential responsive means to the outer system terminals alternately in opposite senses with changes in polarity of successive half cycles of potential applied to the system input terminals.

2. The system according to claim 1 wherein said two potential responsive means have different sensitivities whereby the responses of the potential responsive means to the two conditions of conductivities of the device under test may be observed with substantially equal facility.

3. The system according to claim 1 wherein said two potential responsive means comprise an oscilloscope having horizontal and vertical inputs respectively.

4. A test system for demonstrating the operating characteristics of an asymmetrically conducting device, said system comprising a pair of system terminals for connection to an alternating current source, a load connection between one system terminal and a common system terminal, said common system terminal and other system terminal being connected to the device to be tested, a pair of potential responsive means connected to have one common terminal and two outer terminals, a direct electrical connection between the two common terminals, four rectifiers, the first having one rectifier terminal connected to the one system terminal, said one rectifier having its other rectifier terminal connected to one outer terminal of one potential responsive means, said second rectifier having its corresponding one rectifier terminal connected to the outer terminal of the other potential responsive means, and having its corresponding other rectifier terminal connected to the other system terminal, said third rectifier having its corresponding one terminal connected to the one corresponding terminal of the second rectifier, said third rectifier having its other corresponding terminal connected to the one terminal of the first rectifier, said fourth rectifier having its one corresponding terminal directly connected to the other terminal of the second rectifier, said fourth rectifier having its other corresponding terminal connected to the other terminal of the first rectifier.

5. The system according to claim 4 wherein said potential responsive means comprise an oscilloscope having horizontal and vertical deflection inputs with a common ground terminal.

6. A test system for demonstrating the operating characteristics of an asymmetrically conducting device, said system comprising a pair of system terminals for connection to an alternating current source, a load connected between one system terminal and a common system terminal, said common system terminal and other system terminal being connected to the device to be tested, a cathode ray oscilloscope having one common input terminal and two separate input terminals for horizontal and vertical deflections respectively, a direct electrical connection between the two common terminals, four rectifiers, the first having one rectifier terminal connected to the one system terminal, said one rectifier having its other rectifier terminal connected to one oscilloscope input terminal, said second rectifier having its corresponding one rectifier terminal connected to the other oscilloscope input terminal and having its corresponding other rectifier terminal connected to the other system terminal, said third rectifier having its corresponding one terminal connected to the one corresponding terminal of the second rectifier, said third rectifier having its other corresponding terminal connected to the one terminal of the first rectifier, said fourth rectifier having its one corresponding terminal directly connected to the other terminal of the second rectifier, said fourth rectifier having its other corresponding terminal connected to the other terminal of the first rectifier.

References Cited in the file of this patent

UNITED STATES PATENTS 2,406,405    Salisbury _____ Aug. 27, 1946

OTHER REFERENCES

Schwanhausser: Article entitled: "Testing Selenium Rectifier Cells," General Electric Review, November 1944, pages 53–55.